M. A. DENNIS.
Refuse-Strainer for Kitchen Sinks.

No. 220,016.   Patented Sept. 30, 1879.

Attest
W. L. Breath
Wm L Fish

Inventor.
Mary A. Dennis, per
Thos. S. Crane, Atty.

UNITED STATES PATENT OFFICE.

MARY A. DENNIS, OF NEWARK, NEW JERSEY, ASSIGNOR OF ONE-HALF OF HER RIGHT TO WILLIAM H. HARRISON, OF SAME PLACE.

IMPROVEMENT IN REFUSE-STRAINERS FOR KITCHEN-SINKS.

Specification forming part of Letters Patent No. 220,016, dated September 30, 1879; application filed May 9, 1879.

*To all whom it may concern:*

Be it known that I, MARY A. DENNIS, of Newark, in the county of Essex and State of New Jersey, have invented a new and useful Improvement in Refuse-Strainers, which improvement is fully described in the following specification.

My invention relates to an improvement in strainers; and consists in forming such strainers of oblong form, and of concave or bowl shape in section, and also in combining therewith a handle and legs, for the purpose herein set forth.

A strainer for this purpose must be very strong and heavy, as it is constantly exposed to water and subjected to more rough usage than if required for cooking operations, and it should be raised upon legs a sufficient distance from the bottom of the sink to drain freely.

A handle to raise the same for cleaning is also desirable, and it is quite important that the strainer should conform somewhat in shape to one end of the usual square or rectangular sink, that it may interfere with the space as little as possible.

To effect these objects I have designed the strainer shown in the accompanying drawings, in which—

Figure 1:
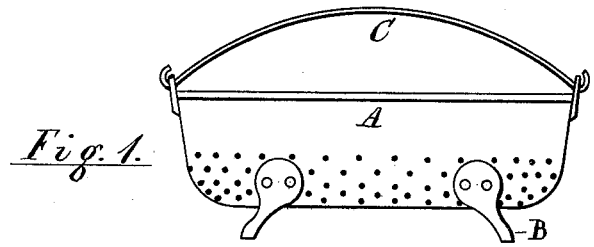
Figure 2:
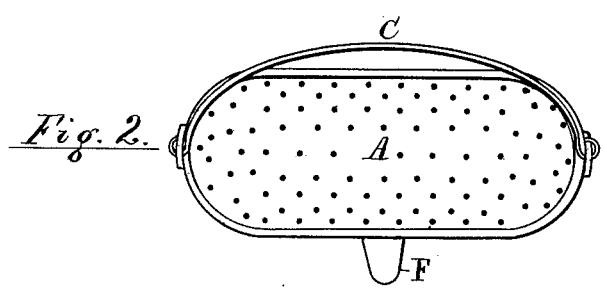
Figure 3:
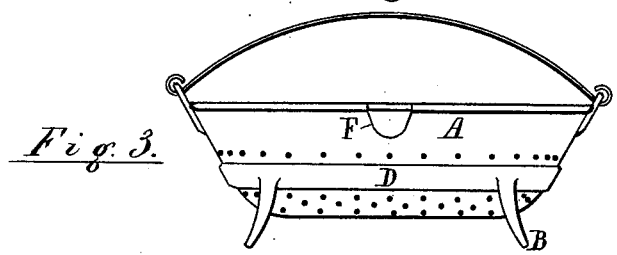
Figure 4:
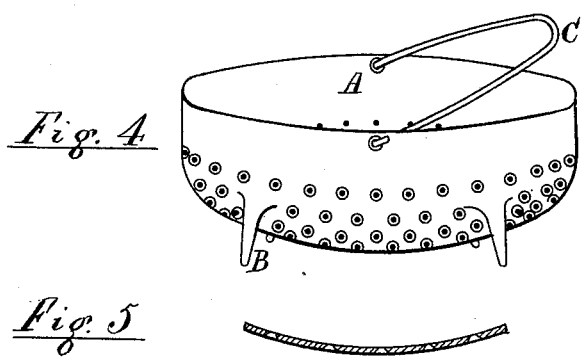

Figure 1 shows the same, made of heavy sheet metal, with legs riveted on. Fig. 2 shows the oblong shape in plan. Fig. 3 shows the sheet-metal vessel strengthened by a band of metal formed in one piece with the legs; and Fig. 4 shows the entire strainer cast in one piece, with the legs and the holes formed at the time of casting.

The vessel is of curved or bowl-shaped section, to be readily cleaned, and when made of iron is intended to be galvanized to preserve it from rust, while the more durable ones may be made of copper.

The bowl is marked A, the legs B, and the handle C. The latter is hooked into the sides of the bowl, or into ears formed on it, so that it may lie down out of the way when not in use.

In Fig. 3, D is the band, of cast metal, with the legs attached to it; and this band may be secured to the vessel some distance below the top, as shown in the drawings, or at the top, which may be turned over it to form a smooth edge.

My strainer is meant to be set in the kitchen-sink, or any other suitable place, for draining the water from wet potato-peelings, skins of fruits and vegetables, and drippings from various cooking utensils, which contain more or less solid matter liable to choke the outlet of an ordinary sink.

The use of such a strainer not only keeps the sink clean and neat, but preserves the refuse to be used in feeding fowls or animals, and in cases where it has to be kept until called for by a scavenger renders it much more compact and less liable to spoil than if mixed with fluid matters.

Figure 5:

To assist in tipping the vessel, in connection with the handle C, I sometimes provide it with a lug, F, attached to the side at the top; and to secure an even surface inside I prefer to make the holes, especially in the strainers of cast metal, as shown in a portion of such a strainer in Fig. 5, with the bevel or countersink around the hole upon the outside of the vessel, so that the inside may be readily cleaned or brushed out.

I am aware that cooking utensils for steaming have been made with holes and with feet also; but their cylindrical form and flat bottoms render them entirely unsuited to the purpose I have specified, as I find that the concave or bowl shape shown in Figs. 1, 3, 4 is essential to a refuse-strainer, that it may present no corners to retain the grease and dirt, and may be readily cleansed by a sink-brush.

By the combination of the features herein described I secure a durable and convenient utensil, especially adapted to the purpose set forth, and I therefore claim the same, as follows:

1. As a new article of manufacture, a strainer of bowl shape, provided with legs and handle, for the purpose set forth, and having an oblong form when viewed from the top, to fit the end of a kitchen-sink, in the manner herein described.

2. A bailed cast-metal bowl, of oblong form in its plan, having the legs cast thereon, and provided with perforations for straining refuse, substantially as herein shown and described.

In testimony that I claim the foregoing I have hereto set my hand this 7th day of May, 1878.

MARY A. DENNIS.

Witnesses:
WILLIAM H. HARRISON,
THOS. S. CRANE.